United States Patent
Noethen

(10) Patent No.: US 10,139,604 B2
(45) Date of Patent: Nov. 27, 2018

(54) COMPACT ANAMORPHIC OBJECTIVE LENS ASSEMBLY

(71) Applicant: RAYTHEON COMPANY, Waltham, MA (US)

(72) Inventor: Mark Noethen, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 15/478,591

(22) Filed: Apr. 4, 2017

(65) Prior Publication Data

US 2018/0284401 A1    Oct. 4, 2018

(51) Int. Cl.
| | |
|---|---|
| *G02B 13/00* | (2006.01) |
| *G02B 13/16* | (2006.01) |
| *G02B 9/60* | (2006.01) |
| *G02B 13/08* | (2006.01) |
| G02B 9/64 | (2006.01) |

(52) U.S. Cl.
CPC .............. *G02B 13/08* (2013.01); *G02B 9/60* (2013.01); *G02B 13/006* (2013.01); *G02B 13/16* (2013.01); *G02B 9/64* (2013.01)

(58) Field of Classification Search
CPC ........ G02B 13/08; G02B 13/10; G02B 13/12; G02B 13/16; G02B 13/18; G02B 13/0055; G02B 13/006; G02B 9/34; G02B 9/60; G02B 9/62; G02B 9/64
USPC .................................................. 359/668–671
See application file for complete search history.

(56) References Cited

U.S. PATENT DOCUMENTS

| | | |
|---|---|---|
| 6,310,731 B1 | 10/2001 | Wartmann et al. |
| 6,512,636 B2 | 1/2003 | Schauss |
| 7,095,563 B2 | 8/2006 | Nurishi |
| 7,289,272 B2 | 10/2007 | Bowron et al. |
| 2007/0133107 A1 | 6/2007 | Ohzawa et al. |
| 2009/0268305 A1 | 10/2009 | Pretorius |
| 2011/0102758 A1* | 5/2011 | Schwab .............. G03F 7/70075 355/67 |

(Continued)

FOREIGN PATENT DOCUMENTS

DE    2921857 A1    12/1980

OTHER PUBLICATIONS

International Search Report and Written Opinion for application No. PCT/US2018/016603 dated Apr. 25, 2018.

*Primary Examiner* — Jordan Schwartz
(74) *Attorney, Agent, or Firm* — Lando & Anastasi, LLP

(57) ABSTRACT

Aspects are generally directed to a compact anamorphic objective lens assembly. In one example, the objective lens assembly includes a first anamorphic lens group including a first cylindrical lens having a surface optically powered in a first dimension and a second cylindrical lens having a surface optically powered in a second dimension orthogonal to the first dimension, the first anamorphic lens group being positioned to receive visible light along an optical path, a second anamorphic lens group positioned along the optical path to receive the visible light from the first anamorphic lens group, the second anamorphic lens group including a third cylindrical lens having a surface optically powered in the first dimension and a fourth cylindrical lens having a surface optically powered in the second dimension, and an aperture stop centered along the optical path and interposed between the first and second anamorphic lens groups.

17 Claims, 9 Drawing Sheets

(56) References Cited

U.S. PATENT DOCUMENTS

2012/0105945 A1* 5/2012 Erlandson .......... G02B 27/0966
                                                    359/337.2
2013/0022345 A1    1/2013 Dodoc et al.
2016/0103302 A1*  4/2016 Neil .................. G02B 27/0025
                                                    359/670

* cited by examiner

COMPACT ANAMORPHIC OBJECTIVE LENS ASSEMBLY

BACKGROUND

Anamorphic lenses are typically used in cinema projection to convert between an aspect ratio of a native format and an aspect ratio of an on-screen projection format. In cinema projection, the aspect ratio of the on-screen projection is defined as the ratio of the width to the height of the projected image as seen on the screen. The most common aspect ratios are the conventional 1.85:1 "flat" image and the 2.35:1 "scope" image. Even though there are a variety of aspect ratios in use, often the stored native format may have an aspect ratio different from that of the on-screen projected image.

Accordingly, to accomplish the conversion between the aspect ratio of the stored native format and the aspect ratio of the on-screen projected format, the image may be projected through the anamorphic lens. The anamorphic lens enlarges the image along a first axis to a different extent than along a second perpendicular axis. That is, the recorded image may be asymmetrically stretched by the anamorphic lens to achieve a desired on-screen format. Thus, for example, a 1.33:1 native format may be projected in a 1.85:1 on-screen format.

SUMMARY OF THE INVENTION

Aspects and examples are generally directed to a compact anamorphic objective lens assembly which has a reduced total length for a given anamorphic ratio and a given focal length when compared to typical anamorphic lens assemblies. According to certain examples, the objective lens assembly described herein includes one or more crossed cylindrical lens pairs incorporated within a primary lens group and positioned on opposing sides of an aperture stop. As further discussed herein, the objective lens assembly may have a ratio of a lens length to an effective focal length as low as 1.2 and may support a resolution of up to 25 megapixels. As a result of the reduced size and weight of the described objective lens assembly, examples may be incorporated within aerial and other mobile imaging systems which are designed to perform wide area persistent scanning (WAPS) imaging.

According to various aspects, provided is an objective lens assembly. In one example, the objective lens assembly comprises a first anamorphic lens group including at least a first cylindrical lens having a surface optically powered in a first dimension and a second cylindrical lens having a surface optically powered in a second dimension substantially orthogonal to the first dimension, the first anamorphic lens group being positioned to receive visible light along an optical path extending therethrough, a second anamorphic lens group positioned along the optical path to receive the visible light from the first anamorphic lens group, the second anamorphic lens group including at least a third cylindrical lens having a surface optically powered in the first dimension and a fourth cylindrical lens having a surface optically powered in the second dimension, and an aperture stop centered along the optical path and interposed between the first anamorphic lens group and the second anamorphic lens group.

According to various examples, the first cylindrical lens and the second cylindrical lens are arranged as a first crossed cylindrical lens pair, and the third cylindrical lens and the fourth cylindrical lens are arranged as a second crossed cylindrical lens pair. In some examples, the first anamorphic lens group further comprises a fifth cylindrical lens, the fifth cylindrical lens having a surface optically powered in the first dimension. In at least these examples, the second cylindrical lens is interposed between the first cylindrical lens and the fifth cylindrical lens. In at least one example, each of the first cylindrical lens, the third cylindrical lens, and the fifth cylindrical lens are configured to expand the visible light in a plane of the first dimension. In such an example, each of the second cylindrical lens and the fourth cylindrical lens are configured to expand the visible light in a plane of the second dimension. According to certain examples, an anamorphic ratio of the expansion of the visible light within the first dimension and the expansion of the visible light within the second dimension is two.

In various examples, the first cylindrical lens is a first cylindrical doublet. According to some examples, the first anamorphic lens group further comprises a fifth cylindrical lens, and the fifth cylindrical lens is a second cylindrical doublet, the second cylindrical lens being interposed between the first cylindrical doublet and the second cylindrical doublet. In various examples, the second anamorphic lens group further comprises a lens defined by an aspherical surface interposed between the third cylindrical lens and the fourth cylindrical lens.

According to certain examples, the objective lens assembly further comprises an optical receiver centered along the optical path and positioned to receive the visible light from the second anamorphic lens group. In a particular example, the optical receiver is defined by a resolution of 25 megapixels. In certain examples, a ratio of a lens length and an effective focal length of the objective lens assembly is 1.2.

According to various examples, the second anamorphic lens group further comprises at least a first lens defined by a spherical surface interposed between the third cylindrical lens and the fourth cylindrical lens. In certain examples, the first anamorphic lens group further comprises at least a second lens defined by a spherical surface interposed between the second cylindrical lens and the aperture stop.

According to an aspect, provided is another objective lens assembly. In one example, the objective lens assembly comprises a first anamorphic lens group positioned to receive visible light along an optical path and including a first optical sub-group and a second optical sub-group, the first optical sub-group including at least a first pair of crossed cylindrical lenses, and the second optical sub-group including at least a first lens defined by a spherical surface, a second anamorphic lens group positioned along the optical path to receive the visible light from the first anamorphic lens group and including a third optical sub-group and a fourth optical sub-group, the third optical sub-group including at least a second lens defined by a spherical surface, and the fourth optical sub-group including at least a second pair of crossed cylindrical lenses, and an aperture stop centered along the optical path and interposed between the first anamorphic lens group and the second anamorphic lens group.

In various examples, the objective lens assembly further comprises an optical receiver centered along the optical path and positioned to receive the visible light from second anamorphic lens group. In such an example, the optical receiver may be defined by a resolution of 25 megapixels, and a ratio of a lens length and an effective focal length of the objective lens assembly may be 1.2. In some examples, the objective lens assembly further comprises a lens defined by an aspherical surface interposed between a first cylindrical lens and a second cylindrical lens of the second pair of crossed cylindrical lenses.

According to at least one example, at least the first pair of crossed cylindrical lenses and the second pair of crossed cylindrical lenses are positioned to expand the visible light in a first dimension and second dimension substantially orthogonal to the first dimension, and an anamorphic ratio of the expansion of the visible light within the first dimension and the expansion of the visible light within the second dimension is two. In a further example, the first optical sub-group is configured to provide a first focal power having a same sign focal power in the first dimension and the second dimension, and the second optical sub-group is configured to provide a second focal power having a same sign focal power in the first dimension and the second dimension and opposite the sign focal power of the first focal power. In certain examples, the first pair of crossed cylindrical lenses includes at least one cylindrical doublet. In a further example, the second optical sub-group includes a second cylindrical doublet.

According to various aspects, provided is an objective lens assembly. In one example the objective lens assembly comprises a first pair of crossed cylindrical lenses positioned along an optical path to collect visible light, a second pair of crossed cylindrical lenses positioned along the optical path to receive the visible light from the first pair of crossed cylindrical lenses, an aperture stop interposed between the first pair of crossed cylindrical lenses and the second pair of crossed cylindrical lenses, and an optical receiver centered along the optical path and positioned to receive the visible light from the second pair of crossed cylindrical lenses, the optical receiver being defined by a resolution of 25 megapixels and a ratio of a lens length, and an effective focal length of the objective lens 1.2.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1A:
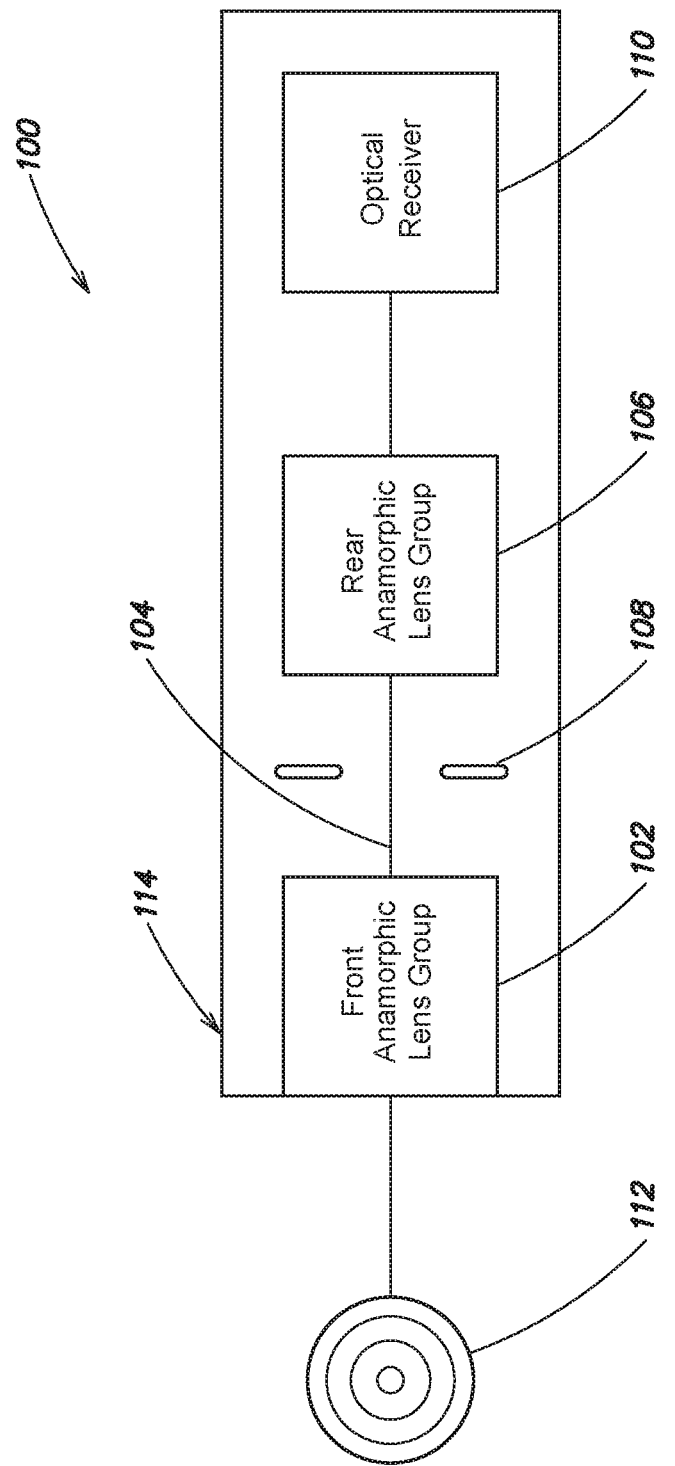
FIG. 1A is a block diagram of an objective lens assembly according to one or more examples.

Aspects and examples are generally directed to a compact anamorphic objective lens assembly. In certain examples, the objective lens assembly includes an arrangement of crossed cylindrical lens pairs positioned on opposing sides of an aperture stop. The arrangement of crossed cylindrical lens pairs, and additional optical elements, achieves a reduced ratio of length to effective focal length when the objective lens assembly is compared to typical anamorphic lens assemblies. Moreover, in addition to reducing the size and weight of the objective lens assembly, the unique arrangement of crossed cylindrical lens pairs and additional optical elements supports at least a 25 megapixel resolution. Accordingly, the various examples of the objective lens assembly discussed herein may be incorporated within wide area persistent scanning (WAPS) imaging systems and other imaging systems designed for platforms with limited available space.

In many aerial imaging applications a field of view of an imaging system (e.g., a WAPS imaging system) is projected at an angle slanted from altitude of the associated aerial platform. While this arrangement allows the imaging system to image "ahead" of the aerial platform, the projected slant often results in a distorted instantaneous field of view on the ground. That is, while an optical receiver of the imaging system may have a substantially square profile, the projected instantaneous field of view is distorted to a rectangular profile based on the angle of projection. While typical cinema projection lenses offer one potential solution to correcting the distorted field of view, current cinema projection lenses are too large and heavy to incorporate within most WAPS imaging systems. For instance, most cinema projection lenses include a simple afocal cylinder lens pair which more than doubles the length of the primary lens group and does not support high resolution imaging. To accommodate high resolution imaging, additional optics must be added, which further increases the size and weight of the lens assembly.

Accordingly, various aspects and examples of the objective lens assembly discussed herein offer an improved lens design with a reduced size and weight. Particular embodiments may be incorporated within imaging systems that have limited available space, such as WAPS imaging systems. While discussed with reference to an aerial imaging system for the purpose of explanation, in various other examples the WAPS imaging system may be designed for a ground platform, a maritime platform, a space platform, or any other mobile platform or vehicle.

It is to be appreciated that embodiments of the systems and apparatuses discussed herein are not limited in application to the details of construction and the arrangement of components set forth in the following description or illustrated in the accompanying drawings. The systems and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Referring to FIG. 1A, illustrated is a block diagram of an objective lens assembly 100 according to at least one example. The objective lens assembly 100 may include a first anamorphic lens group 102 ("front" anamorphic lens group) positioned along an optical path 104, a second anamorphic lens group 106 ("rear" anamorphic lens group) positioned along the optical path 104, an aperture stop 108 centered along the optical path 104 and interposed between the first anamorphic lens group 102 and the second anamorphic lens group 106, and an optical receiver 110 positioned along the optical path 104. The first anamorphic lens group 102 may receive visible light from a scene 112 along the optical path 104 and direct the visible light to the aperture stop 108. That is, the visible light may pass through one or more optical elements of the first anamorphic lens group 102 while being directed to the aperture stop 108.

The aperture stop 108 passes the visible light to the second anamorphic lens group 106, which directs the visible light to the optical receiver 110. As will be readily understood to one of ordinary skill in the art, the aperture stop 108 may be controlled to determine a cone angle of the received visible light and limit the amount of visible light received at an image plane of the objective lens assembly 100. The visible light received from the aperture stop 108 passes through one or more optical elements of the second anamorphic lens group 106 while being directed to the optical receiver 110. While the optical receiver 110 is shown as being incorporated within the objective lens assembly 100 of FIG. 1A, in certain other examples, the objective lens assembly 100 may be separate from the optical receiver 110.

In various examples, the first anamorphic lens group 102, the second anamorphic lens group 106, the aperture stop 108, and the optical receiver 110 of the objective lens assembly 100 are supported within a housing 114. The housing 114 surrounds and protects the components of the objective lens assembly 100 from dirt, dust, moisture, and the like. The housing 114 may include a window through which the first lens group 102 receives the visible light from the scene 112.

Figure 1B:
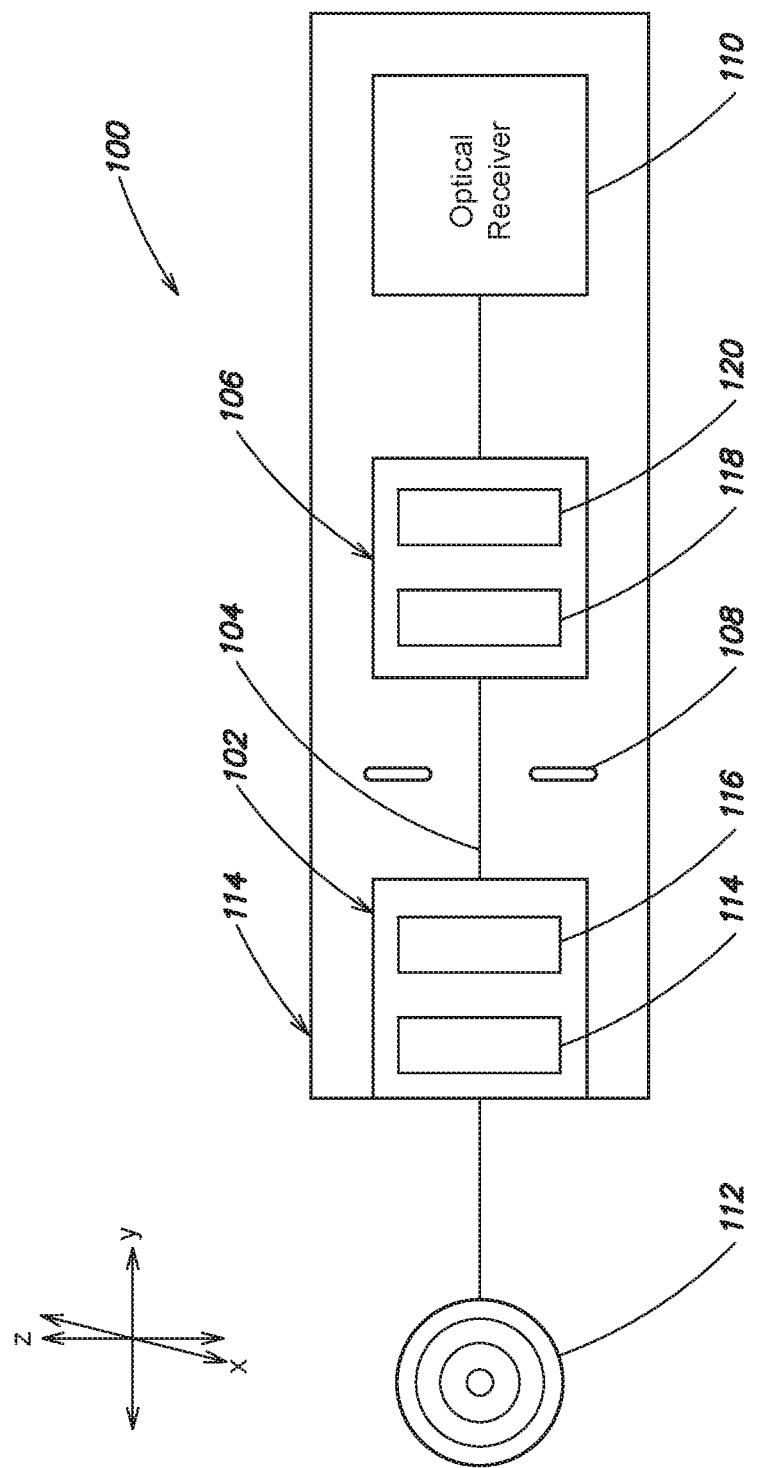
FIG. 1B is a further detailed block diagram of the objective lens assembly illustrated in FIG. 1A, according to one or more examples.

FIG. 1B illustrates another block diagram of the objective lens assembly 100 shown in FIG. 1A. As illustrated, optical elements of the first anamorphic lens group 102 and the second anamorphic lens group 106 may be arranged in one or more sub-groups 114, 116, 118, 120. The first anamorphic lens group 102 is shown as including a first sub-group 114 and a second sub-group 116, and the second anamorphic lens group 106 is shown as including a third sub-group 118 and a fourth sub-group 120. In one example, sub-groups 114, 116, 118, 120 may be arranged according to the focal power that the optical elements within each sub-group 114, 116, 118, 120 provide. For instance, the optical elements of the first sub-group 114 may have a negative sign focal power in a first dimension (e.g., the illustrated z-direction) and in a second dimension orthogonal to the first dimension (e.g., the illustrated x-direction). Similarly, the optical elements of the second sub-group 116 may have a positive sign focal power in the first dimension and the second dimension (e.g., opposite the sign focal power of the first sub-group 114) and the optical elements of the third sub-group 118 may have a negative sign focal power in the first dimension and the second dimension. In such an arrangement, the fourth sub-group 120 may have a different sign focal power in the first dimension and the second dimension. For example, the fourth sub-group 120 may have a positive sign focal power in the first dimension and a negative sign focal power in the second dimension. Various examples of the optical elements within the sub-groups 114, 116, 118, 120 are discussed below with reference to at least FIGS. 2A and 2B, FIGS. 4A and 4B, and FIGS. 5A and 5B.

Figure 2A:
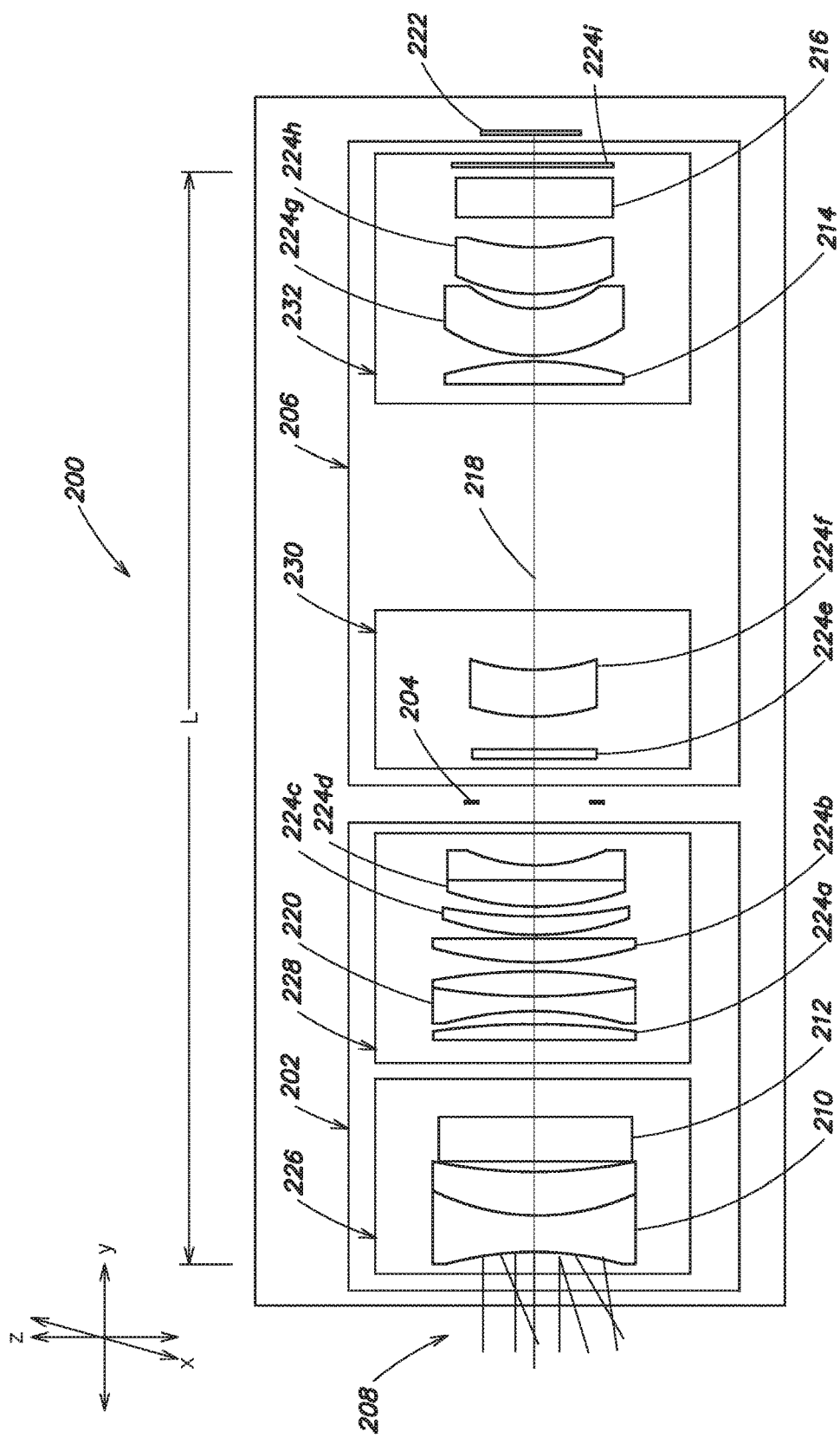
FIG. 2A is a ray trace diagram, in a first dimension, of an objective lens assembly according to one or more examples.
Figure 2B:
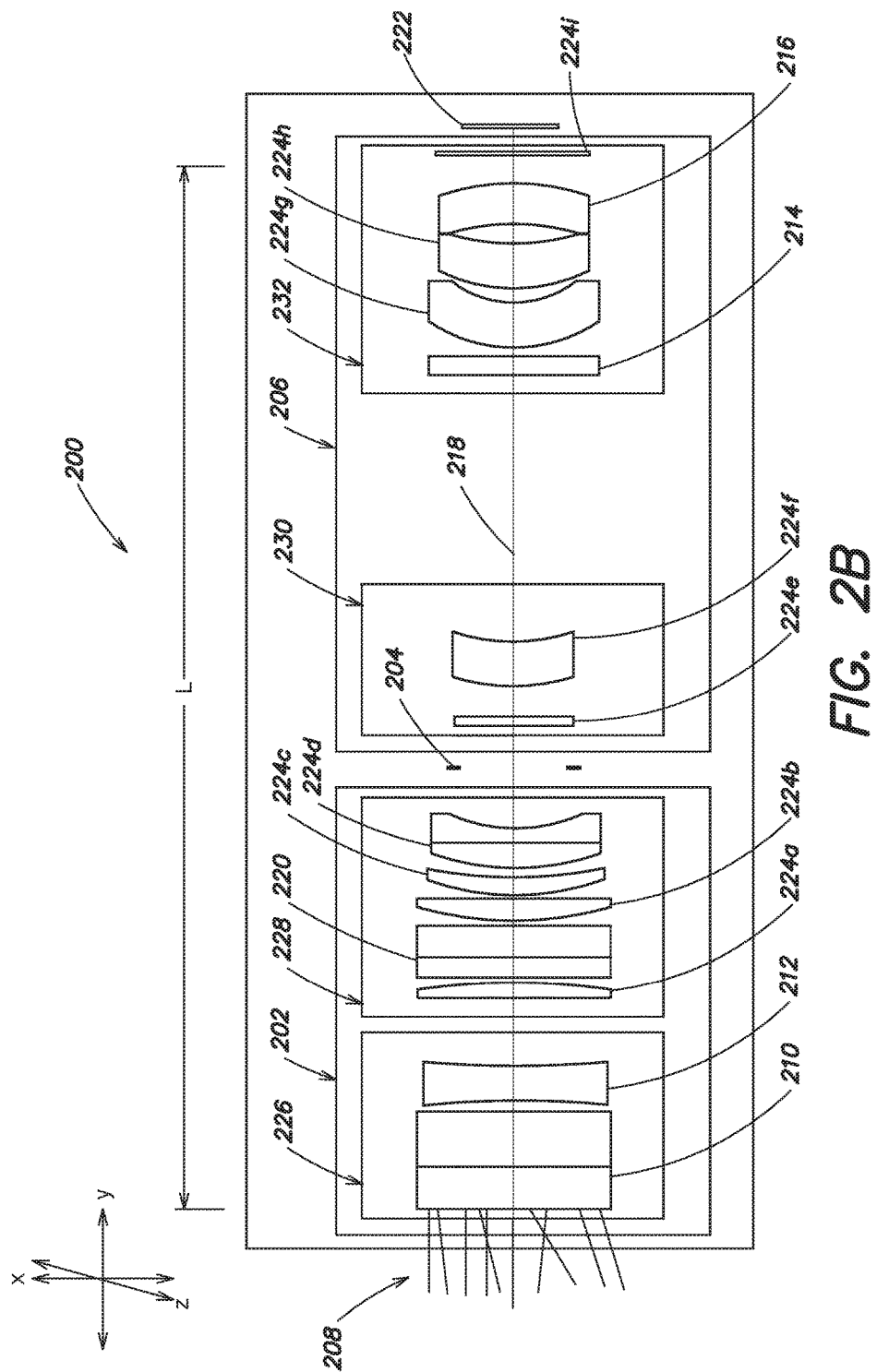
FIG. 2B is a ray trace diagram, in a second dimension orthogonal to the first dimension of FIG. 2A, of the objective lens assembly according to one or more examples.

FIG. 2A and FIG. 2B depict in greater detail one example of the components of an objective lens assembly 200, such as the objective lens assembly 100 illustrated in FIGS. 1A and 1B. In particular, FIG. 2A shows a first view of the optical elements of each of a first anamorphic lens group 202 and a second anamorphic lens group 206, and FIG. 2B shows a second view of the optical elements of each of the first anamorphic lens group 202 and the second anamorphic lens group 206. Optical elements of each of the first anamorphic lens group 202 and the second anamorphic lens group 206 may be arranged in more than one sub-group within the respective anamorphic lens group. For instance, optical elements of the first anamorphic lens group 202 may be arranged in a first sub-group 226 and a second sub-group 228, and optical elements of the second anamorphic lens group 206 may be arranged in a third sub-group 230 and a fourth sub-group 232. In FIG. 2A and FIG. 2B, the received visible light is illustrated by the ray traces 208.

Referring to FIG. 2A, the first anamorphic lens group 202 may include a first cylindrical lens 210 having a surface optically powered in a first dimension and a second cylindrical lens 212 having a surface optically powered in a second dimension substantially orthogonal to the first dimension. FIG. 2A illustrates a view of the objective lens assembly 200 from the perspective of the first dimension (e.g., shown as the z-direction) and FIG. 2B illustrates a view of the objective lens assembly 200 from the perspective of the second dimension (e.g., shown as the x-direction). Similar to the first anamorphic lens group 202, the second anamorphic lens group 206 may include a third cylindrical lens 214 having a surface optically powered in the first dimension and a fourth cylindrical lens 216 having a surface optically powered in the second dimension. In various examples, the first dimension and second dimension are each orthogonal to an optical path 218 and to each other. As shown, the first anamorphic lens group 202 may further include another cylindrical lens (e.g., a fifth cylindrical lens 220) that has a surface optically powered in the first dimension. In the illustration of FIG. 2A, the second cylindrical lens 212 is positioned between the first cylindrical lens 210 and the fifth cylindrical lens 220.

According to various examples, each cylindrical lens 210, 212, 214, 216, 220 of the objective lens assembly 200 includes a lens which substantially focuses or expands light in a plane of the corresponding dimension. That is, each cylindrical lens 210, 212, 214, 216, 220 has a receiving surface (e.g., a cylindrical surface) which is optically powered in a single dimension. For instance, each of the first cylindrical lens 210, the third cylindrical lens 214, and the fifth cylindrical lens 220 may expand the received visible light in the plane of the first dimension, and each of the second cylindrical lens 212 and the fourth cylindrical lens 216 may expand the received visible light in the plane of the second dimension. FIG. 2A, illustrates the surface profile of the optically powered surface(s) of first cylindrical lens 210, the third cylindrical lens 214, and the fifth cylindrical lens 220, and FIG. 2B illustrates the surface profile of the optically powered surface(s) of second cylindrical lens 212 and the fourth cylindrical lens 216.

Figure 3:
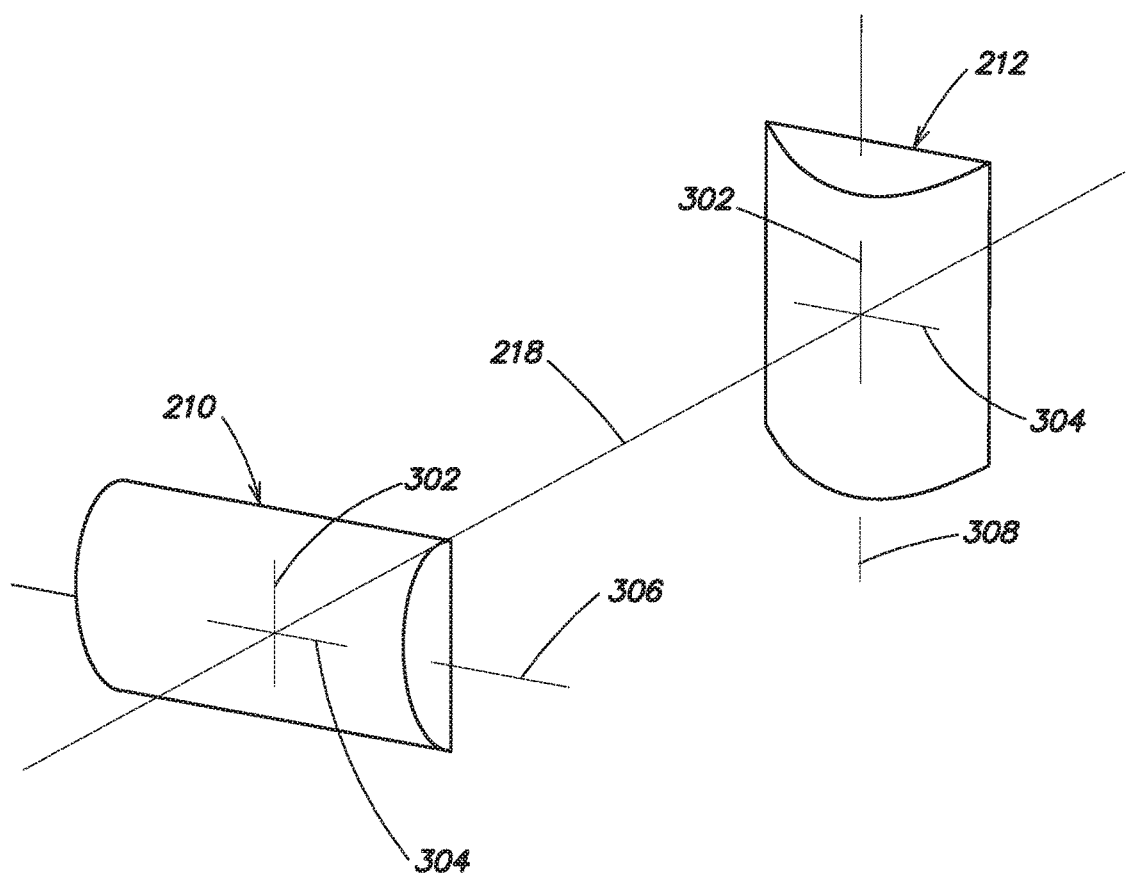
FIG. 3 is a perspective view of two cylindrical lenses included within the objective lens assembly of FIGS. 2A and 2B, according to one or more examples.

FIG. 3 illustrates one example of the first cylindrical lens 210 and the second cylindrical 212 lens of the objective lens assembly 200 shown in FIGS. 2A and 2B. Additional optical elements of the objective lens assembly 200 are not shown in FIG. 3 for the convenience of illustration. As discussed, each cylindrical lens 210, 212, 214, 216, 220 may expand or taper light rays passing therethrough in a corresponding dimension. Specifically, the first dimension includes a plane orthogonal to the optical path 218 and the second dimension (e.g., a vertical direction 302), and the second dimension includes a plane orthogonal to the optical path 218 and the first dimension (e.g., a horizontal direction 304). In FIG. 3, a central axis 306 of the first cylindrical lens 210 is aligned in a direction of the second dimension (e.g., the horizontal direction 304) and a central axis 308 of the second cylindrical lens 212 is aligned in a direction of the first dimension (e.g., the vertical direction 302). Each of the first and second cylindrical lenses 210, 212 is centered about the optical path 218. While not illustrated in FIG. 3, in various examples the third cylindrical lens 214, fourth cylindrical lens 216, and fifth cylindrical lens 220 may be arranged in a similar manner with regard to the corresponding dimension.

In various examples, each of the cylindrical lenses within the first anamorphic lens group 202 and the second anamorphic lens group 206 may be arranged as a crossed cylindrical lens pair. Each crossed cylindrical lens pair may be composed of a cylindrical lens having an optically powered surface in the first dimension and another cylindrical lens having an optically powered surface in the second dimension. For instance, FIG. 3 illustrates one example of a crossed cylindrical lens pair comprised of the first cylindrical lens 210 and the second cylindrical lens 212. Within the second anamorphic lens group 206, the crossed cylindrical lens pair may be composed of the third cylindrical lens 214 and the fourth cylindrical lens 216. Each crossed cylindrical lens pair is arranged to produce an asymmetric "stretching" of the received visible light. In particular, the crossed cylindrical lens pair of the first anamorphic lens group 202 and the crossed cylindrical lens pair of the second anamorphic lens group 206 may be arranged to asymmetrically stretch the received visible light to correct one or more distortions in an instantaneous field of view of an optical receiver 222 that may result from imaging a scene at an angle.

In particular examples, the optical elements of the objective lens assembly 200 are arranged to achieve an anamorphic ratio of two between the expansion of light within the first dimension and the expansion of light within the second dimension (e.g., expansion of light within the second dimension divided by the expansion of light within the first dimension). For example, when combined, each of the first, second, third, fourth, and fifth cylindrical lens 210, 212, 214, 216, 220, as well as the other optical elements of the assembly 200, may expand the received visible light substantially more in one dimension than in the other dimension. In one example, this may include adjusting the focal length twice as much in the first dimension (e.g., vertical direction) as in the second dimension (e.g., horizontal direction), while in other examples it may include adjusting the focal length twice as much in the second dimension as in the first dimension. While an anamorphic ratio of two is described as one example, it is appreciated that in various other examples the optical elements of the objective lens assembly 200 may be arranged to achieve other anamorphic ratios, such as from about 1 to 2.2 (±0.1 or 0.2) As further discussed below, TABLE 1 and TABLE 2 provide examples of surface data for an optical prescription of an example of an objective lens assembly 200 that may be used to achieve an anamorphic ratio of two, for example.

Returning to FIGS. 2A and 2B, in addition to the respective cylindrical lenses, in various examples each of the first anamorphic lens group 202 and the second anamorphic lens group 206 may include additional optical elements. Each additional optical element may include a lens defined by a spherical surface (i.e., a "spherical lens" 224). As illustrated, each spherical lens 224 may be arranged about the various cylindrical lenses of a respective anamorphic lens group 202, 206.

As illustrated in FIGS. 2A and 2B, the first cylindrical lens 210 may be arranged to receive the incident visible light from a scene. The visible light rays may travel along the optical path 218 and through the first cylindrical lens 210 to the second cylindrical lens 212. In various examples, the first cylindrical lens 210 is a first cylindrical doublet. The second cylindrical lens 212 receives the light rays from the first cylindrical lens 210 and directs the rays through a spherical lens 224a to the fifth cylindrical lens 220. The light rays travel through the fifth cylindrical lens 220 to an arrangement of spherical lenses 224b, 224c, 224d before being received at the aperture stop 204. In certain examples, the fifth cylindrical lens 220 is a second cylindrical doublet.

As illustrated, in various examples the aperture stop 204 is positioned between the first anamorphic lens group 202 and the second anamorphic lens group 206. That is, the objective lens assembly 200 has one or more crossed cylindrical lens pairs on both sides of the aperture stop 204. As shown, in FIGS. 2A and 2B the aperture stop 204 is interposed between a spherical lens 224d of the first anamorphic lens group 202 and a spherical lens 224e of the second anamorphic lens group 206. In various examples, the aperture stop 204 may include an independent structure having an aperture therein, as illustrated. However, in certain other examples the aperture stop 204 may include one or more optical elements (e.g., a spherical lens) where the edges of the optical element or an opaque pattern on the optical element define the aperture.

Visible light rays traveling along the optical path 218 and passing through the aperture stop 204 are received at the second anamorphic lens group 206, and in particular, a spherical lens 224e of the second anamorphic lens group 206. Once received, the visible light rays travel from the spherical lens 224e to another spherical lens 224f before being received at the third cylindrical lens 214. The visible light then travels through the third cylindrical lens 214 to an arrangement of spherical lens 224g, 224h before being received along the optical path 218 at the fourth cylindrical lens 216. The fourth cylindrical lens 216 directs the visible light rays through another spherical lens 224i to the optical receiver 222. In certain examples, the optical receiver 222 collects the visible light and performs one or more imaging operations.

As discussed, the optical elements of the first anamorphic lens group 202 and the second anamorphic lens group 206 may be arranged in one or more sub-groups 226, 228, 230, 232 to provide a desired focal power along a length of the objective lens assembly 200. Specifically, the optical elements of the first anamorphic lens group 102 and the optical elements of the second anamorphic lens group 106 may be grouped in the sub-groups 226, 228, 230, 232 such that each sub-group 226, 228, 230, 232 provides a particular sign focal power (i.e., positive or negative) in a particular dimension (e.g., the first dimension or the second dimension). In FIGS. 2A and 2B, the first anamorphic lens group 202 includes a first sub-group 226 and a second sub-group 228, and the second anamorphic lens group 206 includes a third sub-group 230 and a fourth sub-group 232.

In one example, the optical elements of the first sub-group 226 may have a negative sign focal power in the first dimension (e.g., the illustrated z-direction) and in the second dimension orthogonal to the second dimension (e.g., the illustrated x-direction). Similarly, the optical elements of the second sub-group 228 may have a positive sign focal power in the first dimension and the second dimension (e.g., opposite the sign focal power of the first sub-group 226), and the optical elements of the third sub-group 230 may have a negative sign focal power in the first dimension and the second dimension. In such an arrangement, the fourth sub-group 232 may have a different sign focal power in the first dimension from the second dimension. For example, the fourth sub-group 232 may have a positive sign focal power in the first dimension and a negative sign focal power in the second dimension.

As discussed in various examples, the objective lens assembly 200 may be designed to receive light within the visible spectrum portion of the electromagnetic spectrum (e.g., wavelengths from about 380 nm to about 750 nm). Accordingly, the optical receiver 222 of various examples may include any suitable detector sensitive to wavelengths within the visible spectrum. For example, the optical receiver 222 may include a camera or any type of suitable analog or digital recording device. In certain instances, the optical receiver 222 is a sensor which includes a plurality of imaging pixels. Specifically, the optical receiver 222 may include an arrangement of pixels which achieve a resolution of up to 25 megapixels. For aerial imaging platforms, which in many situations image at great distances from a desired scene, such examples can produce high definition images.

In various examples, the objective lens assembly 200 has a reduced total length for a given anamorphic ratio and a given focal length when compared to typical anamorphic lens assemblies. For example, a ratio of length and effective focal length (L/EFL) of the objective lens assembly 200 may be significantly less than most cinematic projection lenses, making the objective lens assembly 200 easier to incorporate within WAPS imaging systems. In one example, the ratio of lens length (shown in FIGS. 2A and 2B as "L") to effective focal length is at most 1.3, and may, in some instances, be as low as 1.2. However, in certain other examples the objective lens assembly 200 may be designed such that a higher ratio of length to effective local length is achieved, such as 1.3, 1.5, or 2.0.

TABLE 1 below provides surface data for an optical prescription for an example of the objective lens assembly 200 illustrated in FIG. 2A and FIG. 2B. The optical prescription for this example of the objective lens assembly 200 may be generated using an equation which is an industry standard and which would be known to those skilled in the art. It is to be appreciated however, that the prescription given in TABLE 1 is merely exemplary, and that the prescriptions of various examples of the objective lens assembly 200 are determined by the intended imaging task to be performed by the objective lens assembly 200. Specifically, TABLE 1 provides a lens type, radius (in inches), separation (in inches), refractive index, and Abbe value for each surface of the optical elements within the objective lens assembly 200.

TABLE 1

| Surface | Type | Radius | Separation | Refractive Index | Abbe Value |
|---|---|---|---|---|---|
| 1 | Cylinder | −3.405 | 0.327 | 1.6201 | 63.48 |
| 2 | Cylinder | 2.139 | 0.420 | 1.7283 | 28.53 |
| 3 | Cylinder | 4.690 | 0.109 | air | |
| 4 | Cylinder (90° Rotation) | −9.838 | 0.420 | 1.8467 | 23.78 |
| 5 | Cylinder (90° Rotation) | 15.120 | 0.651 | air | |
| 6 | | plane | 0.150 | 1.9591 | 17.47 |
| 7 | | −9.793 | 0.092 | air | |
| 8 | Cylinder (90° Rotation) | −4.496 | 0.150 | 1.7552 | 27.58 |
| 9 | Cylinder (90° Rotation) | 6.015 | 0.298 | 1.6935 | 53.21 |
| 10 | Cylinder (90° Rotation) | −3.014 | 0.050 | air | |
| 11 | | 3.525 | 0.198 | 1.5952 | 67.74 |
| 12 | | 20.310 | 0.050 | air | |
| 13 | | 2.527 | 0.192 | 1.5952 | 67.74 |
| 14 | | 5.863 | 0.050 | air | |
| 15 | | 2.130 | 0.246 | 1.6485 | 53.02 |
| 16 | | plane | 0.160 | 1.7495 | 35.33 |
| 17 | | 1.607 | 0.958 | air | |
| 18 | | plane | 0.080 | 1.5168 | 64.17 |
| 19 | | plane | 0.316 | air | |
| 20 | | 2.602 | 0.420 | 1.6378 | 42.41 |
| 21 | | 1.698 | 2.712 | air | |
| 22 | | plane | 0.185 | 1.5952 | 67.74 |
| 23 | Cylinder | −3.181 | 0.065 | air | |
| 24 | | 1.330 | 0.420 | 1.7550 | 52.30 |
| 25 | | 1.022 | 0.134 | air | |
| 26 | | 1.577 | 0.420 | 1.5952 | 67.74 |
| 27 | | 1.648 | 0.265 | air | |
| 28 | Cylinder (90° Rotation) | −1.554 | 0.361 | 1.7550 | 52.32 |
| 29 | Cylinder (90° Rotation) | −2.362 | 0.253 | air | |
| 30 | | plane | 0.028 | 1.5168 | 64.17 |
| 31 | | plane | 0.030 | air | |

Figure 4A:
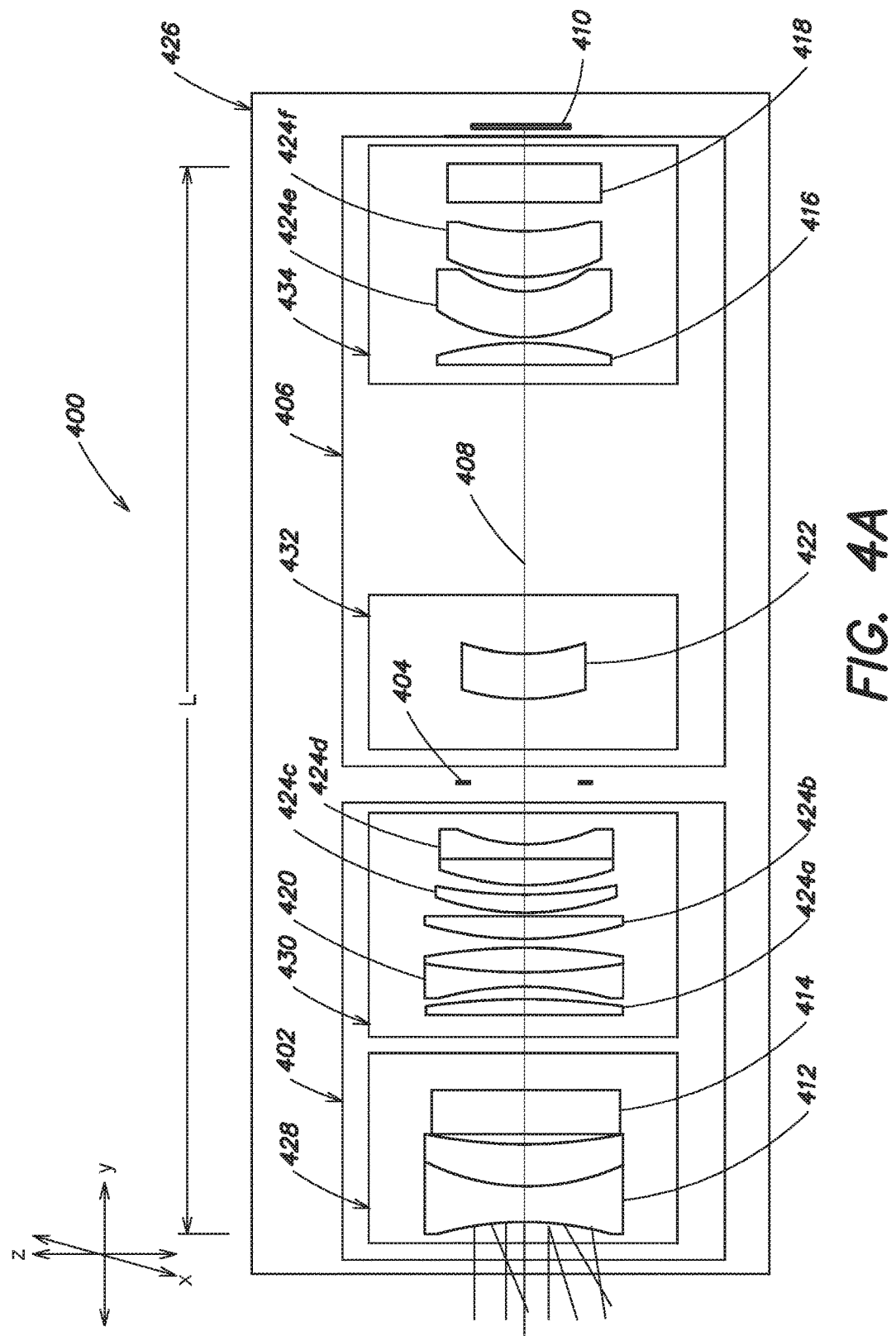
FIG. 4A is a ray trace diagram, in a first dimension, of an objective lens assembly according to one or more examples.
Figure 4B:
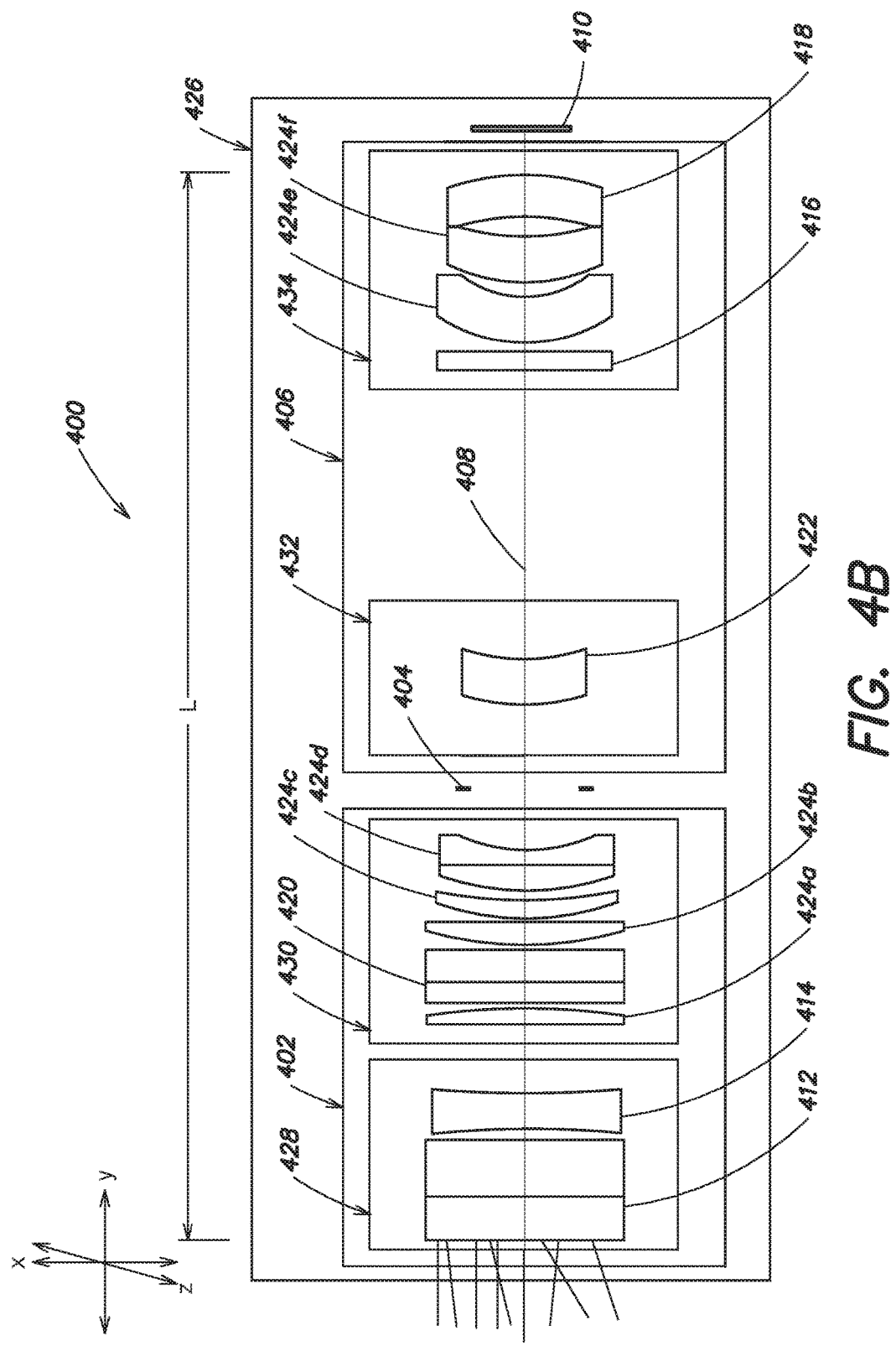
FIG. 4B is a ray trace diagram, in a second dimension orthogonal to the first dimension of FIG. 4A, of the objective lens assembly according to one or more examples.

FIGS. 4A and 4B illustrate another example of an objective lens assembly 400. Similar to FIG. 2A and FIG. 2B, FIG. 4A is a view of the objective lens assembly 400 in a first dimension (e.g., shown as the z-direction), and FIG. 4B is a view of the objective lens assembly 400 in a second dimension (e.g., shown as the x-direction). The objective lens assembly 400 may include many of the same components as the objective lens assembly 200 illustrated in FIGS. 2A and 2B, such as, a first anamorphic lens group 402, a second anamorphic lens group 406, an aperture stop 404 interposed therebetween, an optical receiver 410 and a housing 426. As illustrated in FIGS. 4A and 4B, optical elements of the first anamorphic lens group 402 may be arranged in a first sub-group 428 and a second sub-group 430, and optical elements of the second anamorphic lens group 406 may be arranged in a third sub-group 432 and a fourth sub-group 434.

The first anamorphic lens group 402 may include a first cylindrical lens 412 having a surface optically powered in the first dimension and a second cylindrical lens 414 having a surface optically powered in the second dimension substantially orthogonal to the first dimension. The second anamorphic lens group 406 may include a third cylindrical lens 416 having a surface optically powered in the first dimension and a fourth cylindrical lens 418 having a surface optically powered in the second dimension. The first anamorphic lens group 402 may further include another cylindrical lens (e.g., a fifth cylindrical lens 420) that has a surface optically powered in the first dimension. FIG. 4A illustrates the surface profile of the optically powered surface(s) of the first cylindrical lens 412, the third cylindrical lens 416, and the fifth cylindrical lens 420, and FIG. 4B illustrates the surface profile of the optically powered surface(s) of the second cylindrical lens 414 and the fourth cylindrical lens 418.

Each anamorphic lens group 402, 406 may be positioned along an optical path 408 to receive visible light and may include one or more optical elements (e.g., lenses defined by a spherical surface (i.e., "spherical lenses" 424a-f)) in addition to the respective cylindrical lenses. As also further described with reference to FIGS. 2A and 2B, in certain examples each of the cylindrical lenses within a respective anamorphic lens group may be arranged as a crossed cylindrical lens pair to asymmetrically stretch the received visible light and achieve a predetermined anamorphic ratio, when combined with the other optical elements of the assembly 400. For instance, the first cylindrical lens 412 and the second cylindrical lens 414 may be arranged as a first cylindrical lens pair, and the third cylindrical lens 416 and fourth cylindrical lens 418 may be arranged as a second cylindrical lens pair.

In certain examples, the second anamorphic lens group 406 further includes a lens 422 defined by at least one aspherical surface. FIGS. 4A and 4B illustrate the lens 422 having the aspherical surface axially symmetric about the optical path 408 and positioned between the third cylindrical lens 416 and a spherical lens 424d.

As illustrated in FIGS. 4A and 4B, the optical elements of the first anamorphic lens group 402 and the second anamorphic lens group 406 may be arranged in one or more sub-groups 428, 430, 432, 434 to provide a desired focal power along a length of the objective lens assembly 400. Specifically, the optical elements of the first anamorphic lens group 402 and the second anamorphic lens group 406 may be grouped in the sub-groups 428, 430, 432, 434 such that each sub-group 428, 430, 432, 434 provides a particular sign focal power (i.e., positive or negative) in a particular dimension (e.g., the first dimension or the second dimension). In FIGS. 4A and 4B, the first anamorphic lens group 402 includes a first sub-group 428 and a second sub-group 430, and the second anamorphic lens group includes a third sub-group 432 and a fourth sub-group 434.

In one example, the optical elements of the first sub-group 428 may have a negative sign focal power in the first dimension (e.g., the illustrated z-direction) and in the second dimension orthogonal to the first dimension (e.g., the illustrated x-direction). Similarly, the optical elements of the second sub-group 430 may have a positive sign focal power in the first dimension and the second dimension (e.g., opposite the sign focal power of the first sub-group 428), and the optical elements of the third sub-group 432 may have a negative sign focal power in the first dimension and the second dimension. In such an arrangement, the fourth sub-group 434 may have a different sign focal power in the first dimension and the second dimension. For example, the fourth sub-group 434 may have a positive sign focal power in the first dimension and a negative sign focal power in the second dimension.

In various examples, the objective lens assembly 400 has a reduced total length for a given anamorphic ratio and a given focal length when compared to typical anamorphic lens assemblies. For example, a ratio of length and effective focal length (L/EFL) of the objective lens assembly 400 may be significantly less than most cinematic projection lenses, making the objective lens assembly 400 easier to incorporate within WAPS imaging systems. In one example, the ratio of lens length (shown in FIGS. 4A and 4B as "L") to effective focal length is at most 1.3, and may, in some instances, be as low as 1.2.

TABLE 2 below provides surface data for an optical prescription for an example of the objective lens assembly 400 illustrated in FIG. 4A and FIG. 4B. The optical prescription for this example of the objective lens assembly 400 may be generated using an equation which is an industry standard and which would be known to those skilled in the art. It is to be appreciated however, that the prescription given in TABLE 2 is merely exemplary, and that the prescriptions of various examples of the objective lens assembly 400 are determined by the intended imaging task to be performed by the objective lens assembly. Specifically, TABLE 2 provides a lens type, radius, separation, refractive index, and Abbe value for each surface of the optical elements within the objective lens assembly 400.

TABLE 2

| Surface | Type | Radius | Separation | Refractive Index | Abbe Value |
|---|---|---|---|---|---|
| 1 | Cylinder | −3.149 | 0.318 | 1.620 | 63.48 |
| 2 | Cylinder | 2.112 | 0.420 | 1.728 | 28.53 |
| 3 | Cylinder | 4.779 | 0.107 | air | |
| 4 | Cylinder (90° Rotation) | −10.062 | 0.420 | 1.847 | 23.78 |
| 5 | Cylinder (90° Rotation) | 15.351 | 0.592 | air | |
| 6 | | 82.780 | 0.150 | 1.959 | 17.47 |
| 7 | | −11.446 | 0.095 | air | |
| 8 | Cylinder | −4.618 | 0.150 | 1.755 | 27.58 |
| 9 | Cylinder | 5.522 | 0.306 | 1.694 | 53.20 |
| 10 | Cylinder | −2.948 | 0.050 | air | |
| 11 | | 3.031 | 0.202 | 1.595 | 67.74 |
| 12 | | 11.150 | 0.050 | air | |
| 13 | | 2.492 | 0.186 | 1.595 | 67.74 |
| 14 | | 5.180 | 0.050 | air | |
| 15 | | 2.242 | 0.236 | 1.648 | 53.02 |
| 16 | | 55.706 | 0.150 | 1.750 | 35.33 |
| 17 | | 1.689 | 1.373 | air | |
| 18 | Asphere | 3.210 | 0.401 | 1.638 | 42.41 |
| 19 | | 2.161 | 2.794 | air | |
| 20 | Cylinder | −76.931 | 0.181 | 1.595 | 67.74 |
| 21 | Cylinder | −3.169 | 0.050 | air | |
| 22 | | 1.366 | 0.420 | 1.755 | 52.30 |
| 23 | | 1.033 | 0.123 | air | |
| 24 | | 1.506 | 0.419 | 1.595 | 67.74 |
| 25 | | 1.517 | 0.269 | air | |
| 26 | Cylinder (90° Rotation) | −1.645 | 0.388 | 1.755 | 52.32 |
| 27 | Cylinder (90° Rotation) | −2.555 | 0.300 | | |

According to certain examples, the lens 422 having an aspheric surface has a fourth order asphere coefficient of −0.00860, a sixth order asphere coefficient of −0.00319, and an eighth order asphere coefficient of 0.00222.

Figure 5A:
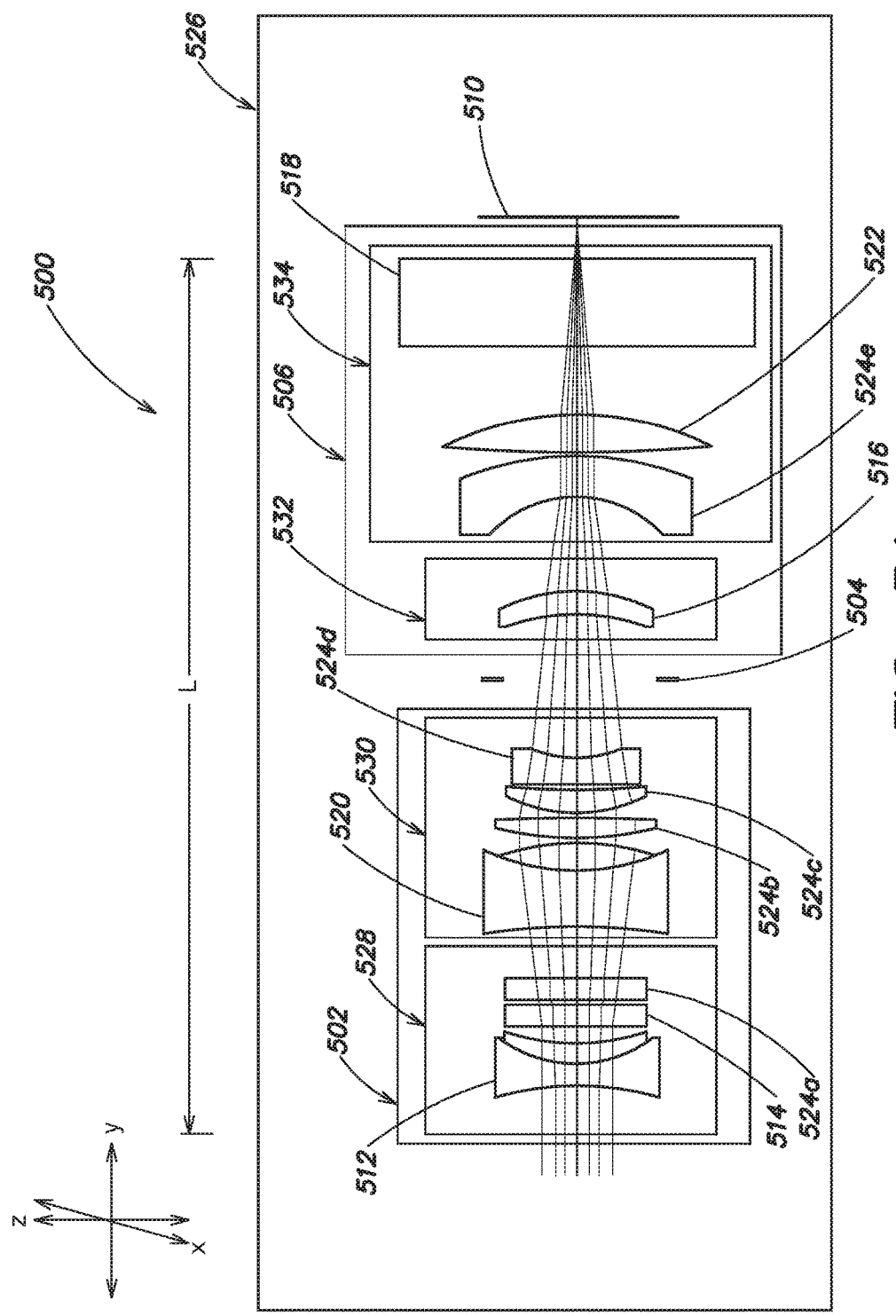
FIG. 5A is a ray trace diagram, in a first dimension, of an objective lens assembly according to one or more examples.
Figure 5B:
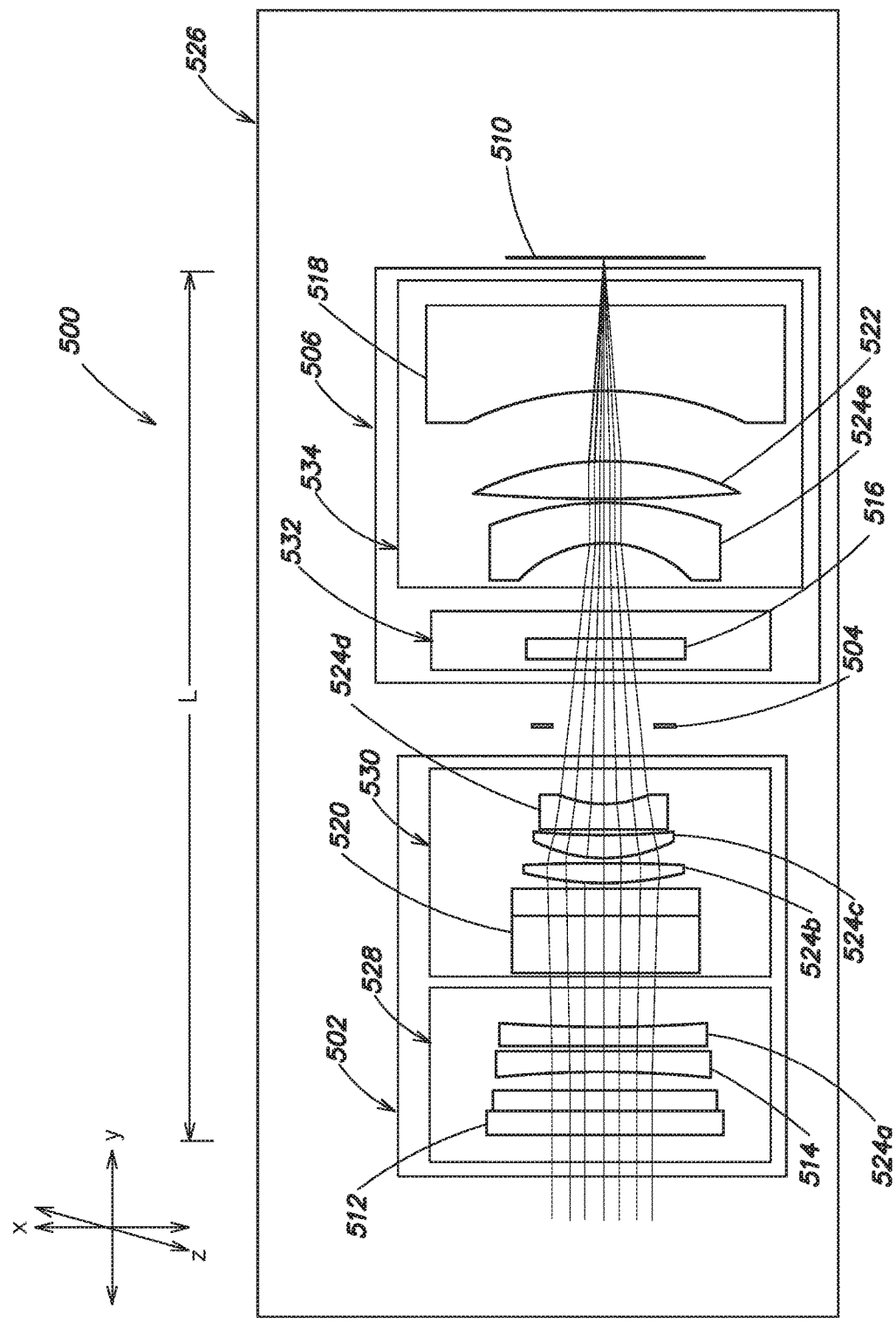
FIG. 5B is a ray trace diagram, in a second dimension orthogonal to the first dimension of FIG. 5A, of the objective lens assembly according to one or more examples.

FIGS. 5A and 5B illustrate another example of an objective lens assembly 500. Similar to FIGS. 2A and 2B and FIGS. 4A and 4B, FIG. 5A is a view of the objective lens assembly 500 in a first dimension (e.g., shown as the z-direction), and FIG. 5B is a view of the objective lens assembly 500 in a second dimension (e.g., shown as the z-direction). The objective lens assembly 500 may include many of the same components as the objective lens assembly 200 illustrated in FIGS. 2A and 2B, such as, a first anamorphic lens group 502, a second anamorphic lens group 506, an aperture stop 504 interposed therebetween, an optical receiver 510 and a housing 526. As illustrated in FIGS. 5A and 5B, optical elements of the first anamorphic lens group 502 may be arranged in a first sub-group 528 and a second sub-group 530, and optical elements of the second anamorphic lens group 506 may be arranged in a third sub-group 532 and a fourth sub-group 534.

The first anamorphic lens group 502 may include a first cylindrical lens 512 having a surface optically powered in the first dimension and a second cylindrical lens 514 having a surface optically powered in the second dimension substantially orthogonal to the first dimension. The second anamorphic lens group 506 may include a third cylindrical lens 516 having a surface optically powered in the first dimension, and a fourth cylindrical lens 518 having a surface optically powered in the second dimension. The first anamorphic lens group 502 may further include another cylindrical lens (e.g., a fifth cylindrical lens 520) that has a surface optically powered in the first dimension. Accordingly, FIG. 5A illustrates the surface profile of the optically powered surface(s) of the first cylindrical lens 512, the third cylindrical lens 516, and the fifth cylindrical lens 520, and FIG. 5B illustrates the surface profile of the optically powered surface(s) of the second cylindrical lens 514 and the fourth cylindrical lens 518.

Each anamorphic lens group 502, 506 may be positioned along an optical path to receive visible light and may include one or more optical elements (e.g., lenses defined by a spherical surface (i.e., "spherical lenses" 524a-e)) in addition to the respective cylindrical lenses. As also further described with reference to FIGS. 2A and 2B, in certain examples each of the cylindrical lenses within a respective anamorphic lens group may be arranged as a crossed cylindrical lens pair to asymmetrically stretch the received visible light and achieve a predetermined anamorphic ratio when combined with the other optical elements of the assembly 500. For instance, the first cylindrical lens 512 and the second cylindrical lens 514 may be arranged as a first cylindrical lens pair, and the third cylindrical lens 516 and the fourth cylindrical lens 518 may be arranged as a second cylindrical lens pair.

In certain examples, the second anamorphic lens group 506 further includes a lens 522 defined by at least one aspherical surface. FIGS. 5A and 5B illustrate the lens 522 having the aspherical surface axially symmetric about the optical path and positioned between the fourth cylindrical lens 518 and a spherical lens 524e.

As illustrated in FIGS. 5A and 5B, the optical elements of the first anamorphic lens group 502 and the second anamorphic lens group 506 may be arranged in one or more sub-groups 528, 530, 532, 534 to provide a desired focal power along a length of the objective lens assembly 500. Specifically, the optical elements of the first anamorphic lens group 502 and the second anamorphic lens group 506 may be grouped in the sub-groups 528, 530, 532, 534 such that each sub-group 528, 530, 532, 534 provides a particular sign focal power (i.e., positive or negative) in a particular dimension (e.g., the first dimension or the second dimension). In FIGS. 5A and 5B, the first anamorphic lens group 502 includes a first sub-group 528 and a second sub-group 530, and the second anamorphic lens group includes a third sub-group 532 and a fourth sub-group 534.

In one example, the optical elements of the first sub-group 528 may have a negative sign focal power in the first dimension (e.g., the illustrated z-direction) and in the second dimension orthogonal to the first dimension (e.g., the illustrated x-direction). Similarly, the optical elements of the second sub-group 530 may have a positive sign focal power in the first dimension and the second dimension. In such an arrangement, the third sub-group 532 may have a different sign focal power in the first dimension and the second dimension. For example, the third sub-group 532 may have a positive sign focal power in the first dimension and no focal power in the second dimension. The optical elements of the fourth sub-group 534 may have a negative sign focal power in the first dimension and the second dimension.

In various examples, the objective lens assembly 500 has a reduced total length for a given anamorphic ratio and a given focal length when compared to typical anamorphic lens assemblies. For example, a ratio of length and effective focal length (L/EFL) of the objective lens assembly 500 may be significantly less than most cinematic projection lenses, making the objective lens assembly 500 easier to incorporate within WAPS imaging systems. In one example, the ratio of lens length (shown in FIGS. 5A and 5B as "L") to effective focal length is at most 1.3, and may, in some instances, be as low as 1.2.

TABLE 3 below provides surface data for an optical prescription for an example of the objective lens assembly 500 illustrated in FIG. 5A and FIG. 5B. The optical prescription for this example of the objective lens assembly 500 may be generated using an equation which is an industry standard and which would be known to those skilled in the art. It is to be appreciated however, that the prescription given in TABLE 3 is merely exemplary, and that the prescriptions of various examples of the objective lens assembly 500 are determined by the intended imaging task to be performed by the objective lens assembly. Specifically, TABLE 3 provides a lens type, radius, separation, refractive index, and Abbe value for each surface of the optical elements within the objective lens assembly 500.

TABLE 3

| Surface | Type | Radius | Separation | Refractive Index | Abbe Value |
|---|---|---|---|---|---|
| 1 | Cylinder | −1.532 | 0.100 | 1.618 | 63.39 |
| 2 | Cylinder | 0.614 | 0.100 | 1.847 | 28.83 |
| 3 | Cylinder | 1.040 | 0.076 | air | |
| 4 | Cylinder (90° Rotation) | −6.788 | 0.100 | 1.847 | 28.83 |
| 5 | | plane | 0.020 | air | |
| 6 | | plane | 0.100 | 1.915 | 21.17 |
| 7 | | 23.358 | 0.238 | air | |
| 8 | Cylinder | −2.831 | 0.255 | 1.717 | 29.52 |
| 9 | Cylinder | 1.051 | 0.126 | 1.729 | 54.68 |
| 10 | Cylinder | −1.346 | 0.020 | air | |
| 11 | | 1.373 | 0.100 | 1.613 | 58.71 |
| 12 | | −4.771 | 0.020 | air | |
| 13 | | 0.802 | 0.110 | 1.678 | 55.20 |
| 14 | | 3.895 | 0.020 | air | |
| 15 | | 59.388 | 0.126 | 1.620 | 36.26 |
| 16 | | 0.740 | 0.657 | | |
| 17 | Cylinder | −1.243 | 0.100 | 1.654 | 39.70 |
| 18 | Cylinder | −0.935 | 0.436 | air | |
| 19 | | −0.590 | 0.190 | 1.734 | 51.47 |
| 20 | | −1.566 | 0.020 | air | |
| 21 | | 8.278 | 0.167 | 1.622 | 53.27 |
| 22 | Asphere | −1.468 | 0.323 | air | |
| 23 | Cylinder (90° Rotation) | −1.512 | 0.397 | 1.642 | 58.37 |
| 24 | | plane | 0.200 | air | |

According to certain examples, the lens 522 having an aspheric surface has a fourth order asphere coefficient of 0.03582, a sixth order asphere coefficient of −0.00319, and an eighth order asphere coefficient of 0.00296.

As such, aspects and examples described herein provide a compact anamorphic objective lens assembly which has a reduced total length for a given anamorphic ratio and a given focal length. As a result of the reduced size and weight of the discussed objective lens assembly, examples may be incorporated within platforms in which available space is limited and weight is a significant design factor.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An objective lens assembly comprising:
   a first anamorphic lens group including at least a first cylindrical lens having a surface optically powered in a first dimension, a second cylindrical lens having a surface optically powered in a second dimension substantially orthogonal to the first dimension, and a fifth cylindrical lens having a surface optically powered in the first dimension, the first anamorphic lens group being positioned to receive visible light along an optical path extending therethrough, and the second cylindrical lens being interposed between the first cylindrical lens and the fifth cylindrical lens along the optical path;
   a second anamorphic lens group positioned along the optical path to receive the visible light from the first anamorphic lens group, the second anamorphic lens group including at least a third cylindrical lens having a surface optically powered in the first dimension and a fourth cylindrical lens having a surface optically powered in the second dimension; and
   an aperture stop centered about the optical path in a vertical direction relative to the optical path and interposed between the first anamorphic lens group and the second anamorphic lens group.

2. The objective lens assembly of claim 1, wherein each of the first cylindrical lens, the third cylindrical lens, and the fifth cylindrical lens are configured to expand the visible light in a plane of the first dimension.

3. The objective lens assembly of claim 2, wherein each of the second cylindrical lens and the fourth cylindrical lens are configured to expand the visible light in a plane of the second dimension.

4. The objective lens assembly of claim 3, wherein an anamorphic ratio of the expansion of the visible light within the first dimension and the expansion of the visible light within the second dimension is two.

5. The objective lens assembly of claim 1, wherein the first cylindrical lens is a first cylindrical doublet consisting of a first cylindrical lens element paired with a first additional lens element.

6. The objective lens assembly of claim 5, wherein the fifth cylindrical lens is a second cylindrical doublet, the second cylindrical lens being interposed between the consisting of a second cylindrical lens element paired with a second additional lens element.

7. The objective lens assembly of claim 1, wherein the second anamorphic lens group further comprises a lens defined by an aspherical surface interposed between the third cylindrical lens and the fourth cylindrical lens.

8. The objective lens assembly of claim 1, further comprising an optical receiver centered about the optical path in the vertical direction relative to the optical path and positioned to receive the visible light from the second anamorphic lens group, wherein the optical receiver is defined by a resolution of 25 megapixels.

9. The objective lens assembly of claim 8, wherein a ratio of an overall physical length of the objective lens assembly and an effective focal length of the objective lens assembly is 1.2.

10. The objective lens assembly of claim 1, wherein the second anamorphic lens group further comprises at least a first lens defined by a spherical surface interposed between the third cylindrical lens and the fourth cylindrical lens.

11. The objective lens assembly of claim 10, wherein the first anamorphic lens group further comprises at least a second lens defined by a spherical surface interposed between the second cylindrical lens and the aperture stop.

12. An objective lens assembly comprising:
    a first anamorphic lens group positioned to receive visible light along an optical path and including a first optical sub-group and a second optical sub-group, the first optical sub-group including at least a first pair of crossed cylindrical lenses, and the second optical sub-group including at least a first lens defined by a spherical surface, wherein the first optical sub-group is configured to provide a first focal power having a same sign focal power in the first dimension and the second dimension, and the second optical sub-group is configured to provide a second focal power having a same sign focal power in the first dimension and the second dimension and opposite the sign focal power of the first focal power;
    a second anamorphic lens group positioned along the optical path to receive the visible light from the first anamorphic lens group and including a third optical sub-group and a fourth optical sub-group, the third optical sub-group including at least a second lens defined by a spherical surface, and the fourth optical sub-group including at least a second pair of crossed cylindrical lenses; and
    an aperture stop centered about the optical path in a vertical direction relative to the optical path and interposed between the first anamorphic lens group and the second anamorphic lens group.

13. The objective lens assembly of claim 12, further comprising an optical receiver centered about the optical path in the vertical direction relative to the optical path and positioned to receive the visible light from second anamorphic lens group, wherein the optical receiver is defined by a resolution of 25 megapixels, and wherein a ratio of an overall physical length of the objective lens assembly and an effective focal length of the objective lens assembly is 1.2.

14. The objective lens assembly of claim 12, further comprising a lens defined by an aspherical surface interposed between a first cylindrical lens and a second cylindrical lens of the second pair of crossed cylindrical lenses.

15. The objective lens assembly of claim 12, wherein at least the first pair of crossed cylindrical lenses and the second pair of crossed cylindrical lenses are positioned to expand the visible light in a first dimension and second dimension substantially orthogonal to the first dimension, wherein an anamorphic ratio of the expansion of the visible light within the first dimension and the expansion of the visible light within the second dimension is two.

16. The objective lens assembly of claim 12, wherein the first pair of crossed cylindrical lenses includes a first cylindrical doublet consisting of a first cylindrical lens element paired with a first additional lens element.

17. The objective lens assembly of claim 16, wherein the second optical sub-group includes a second cylindrical doublet consisting of a second cylindrical lens element paired with a second additional lens element.

\* \* \* \* \*

UNITED STATES PATENT AND TRADEMARK OFFICE
CERTIFICATE OF CORRECTION

PATENT NO. : 10,139,604 B2
APPLICATION NO. : 15/478591
DATED : November 27, 2018
INVENTOR(S) : Mark Noethen Page 1 of 1

It is certified that error appears in the above-identified patent and that said Letters Patent is hereby corrected as shown below:

In the Claims

Column 15, Lines 61-65 should read:
6. The objective lens assembly of claim 5, wherein the fifth cylindrical lens is a second cylindrical doublet consisting of a second cylindrical lens element paired with a second additional lens element.

Signed and Sealed this
Seventh Day of May, 2019

Andrei Iancu
*Director of the United States Patent and Trademark Office*